United States Patent
Muhlestein et al.

(10) Patent No.: US 9,667,646 B2
(45) Date of Patent: May 30, 2017

(54) MAINTAINING DYNAMIC CONFIGURATION INFORMATION OF A MULTI-HOST OFF-CLUSTER SERVICE ON A CLUSTER

(71) Applicant: NETAPP, INC., Sunnyvale, CA (US)

(72) Inventors: Mark Muhlestein, Sunnyvale, CA (US); Rajesh Jaiswal, Bangalore (IN); Sunil Bhargo, Bangalore (IN); Mankawaldeep Singh, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 198 days.

(21) Appl. No.: 14/620,711

(22) Filed: Feb. 12, 2015

(65) Prior Publication Data

US 2016/0241572 A1    Aug. 18, 2016

(51) Int. Cl.
*H04L 29/06* (2006.01)
*G06F 21/57* (2013.01)

(52) U.S. Cl.
CPC ............ *H04L 63/145* (2013.01); *G06F 21/57* (2013.01)

(58) Field of Classification Search
CPC .... H04L 63/1416; H04L 63/14; G06F 21/552
See application file for complete search history.

(56) References Cited

U.S. PATENT DOCUMENTS

| 7,076,650 B1* | 7/2006 | Sonnenberg | ........ H04L 63/1408 713/151 |
| 2003/0131256 A1* | 7/2003 | Ackroyd | ............... G06F 21/552 726/23 |
| 2011/0296187 A1* | 12/2011 | Bisso | .................... H04L 9/3239 713/176 |

\* cited by examiner

*Primary Examiner* — Jason K Gee
(74) *Attorney, Agent, or Firm* — LeClairRyan, a Professional Corporation

(57) ABSTRACT

Techniques for maintaining dynamic configuration information of a multi-host off-cluster service on a cluster are described. An apparatus may comprise a dynamic configuration validation service component to execute to execute a dynamic configuration validation service for scanning files in a cluster of nodes. The dynamic configuration validation service component operative to validate a scanner version for each one of multiple scanners for scanning a file in a cluster of nodes, maintain the scanner version in a list of valid scanner versions for the multiple scanners, and scan the file by one of the one of multiple scanners having the scanner version contained in the list of the valid scanner versions.

18 Claims, 12 Drawing Sheets

202

| | VENDOR | VERSION | VERSION ID | CONNECTION COUNT | TIMEOUT |
|---|---|---|---|---|---|
| 20 | | | | | |
| 30 | AV1 | 1.0 | 9 | 0 | 12H |
| 40 | AV1 | 1.1 | 11 | 1 | - |
| 50 | AV1 | 1.2 | 12 | 2 | - |
| 60 | AV2 | 5.0 | 10 | 2 | - |

302 — VENDOR
304 — VERSION
306 — VERSION ID
308 — CONNECTION COUNT
310 — TIMEOUT

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 1 | NEVER |

FIG. 3C

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 1 | NEVER |
| 30 | SCANMASTER | V5.644 | 53 | 1 | NEVER- |

FIG. 3D

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 0 | 12H |
| 30 | SCANMASTER | V5.644 | 53 | 2 | NEVER |

FIG. 3E

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 1 | NEVER |
| 30 | SCANMASTER | V5.644 | 53 | 2 | NEVER |

FIG. 3F

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 1 | NEVER |
| 30 | SCANMASTER | V5.644 | 53 | 1 | NEVER |

FIG. 3G

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 1 | NEVER |
| 30 | SCANMASTER | V5.644 | 53 | 1 | NEVER |
| 40 | SCANMASTER | V5.650 | 54 | 1 | NEVER |

FIG. 3H

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 52 | 0 | 12H |
| 30 | SCANMASTER | V5.644 | 53 | 0 | 12H |
| 40 | SCANMASTER | V5.650 | 54 | 3 | NEVER |

FIG. 3I

| | 302 | 304 | 306 | 308 | 310 |
|---|---|---|---|---|---|
| 202 | VENDOR | VERSION | VERSION ID | CONNECTION COUNT | TIMEOUT |
| 20 | SCANMASTER | V5.643 | 54 | 3 | NEVER |
| 50 | MALAWAY | V.5349.5549.078 | 55 | 1 | NEVER |

MAINTAINING DYNAMIC CONFIGURATION INFORMATION OF A MULTI-HOST OFF-CLUSTER SERVICE ON A CLUSTER

BACKGROUND

As computer systems have become faster and more reliable, the deployment of network data storage systems in enterprise computing environments has become more widespread. In a typical enterprise computing environment, client systems such as computer workstations, database servers, web servers, and other application servers can access data stored remotely from the client systems, typically in one or more central locations. One or more computer networks connect the client systems to mass storage devices such as disks disposed at the central locations. Such centralized data storage, often referred to simply as network data storage, facilitates the sharing of data among many geographically distributed client systems. Network data storage also enables information systems (IS) departments to use highly reliable (sometimes redundant) computer equipment to store their data.

These computer systems offer end users unprecedented access to information of all types on a global basis. With the proliferation of wireless communication, users can now access these computer networks from practically anywhere. Connectivity of this magnitude has magnified the impact of computer viruses. Computer viruses have a devastating impact on computer systems worldwide in terms of costs, productivity loss and data privacy. As such, a need exist to provide increased protection against a computer virus.

BRIEF DESCRIPTION OF THE DRAWINGS

FIG. 3A illustrates an embodiment of version table of FIG. 2.

FIG. 3B-3I illustrate embodiments for a sequence of events for maintaining dynamic configuration information using version table of FIG. 2 and embodiments of FIGS. 4-7.

DETAILED DESCRIPTION

Figure 1:
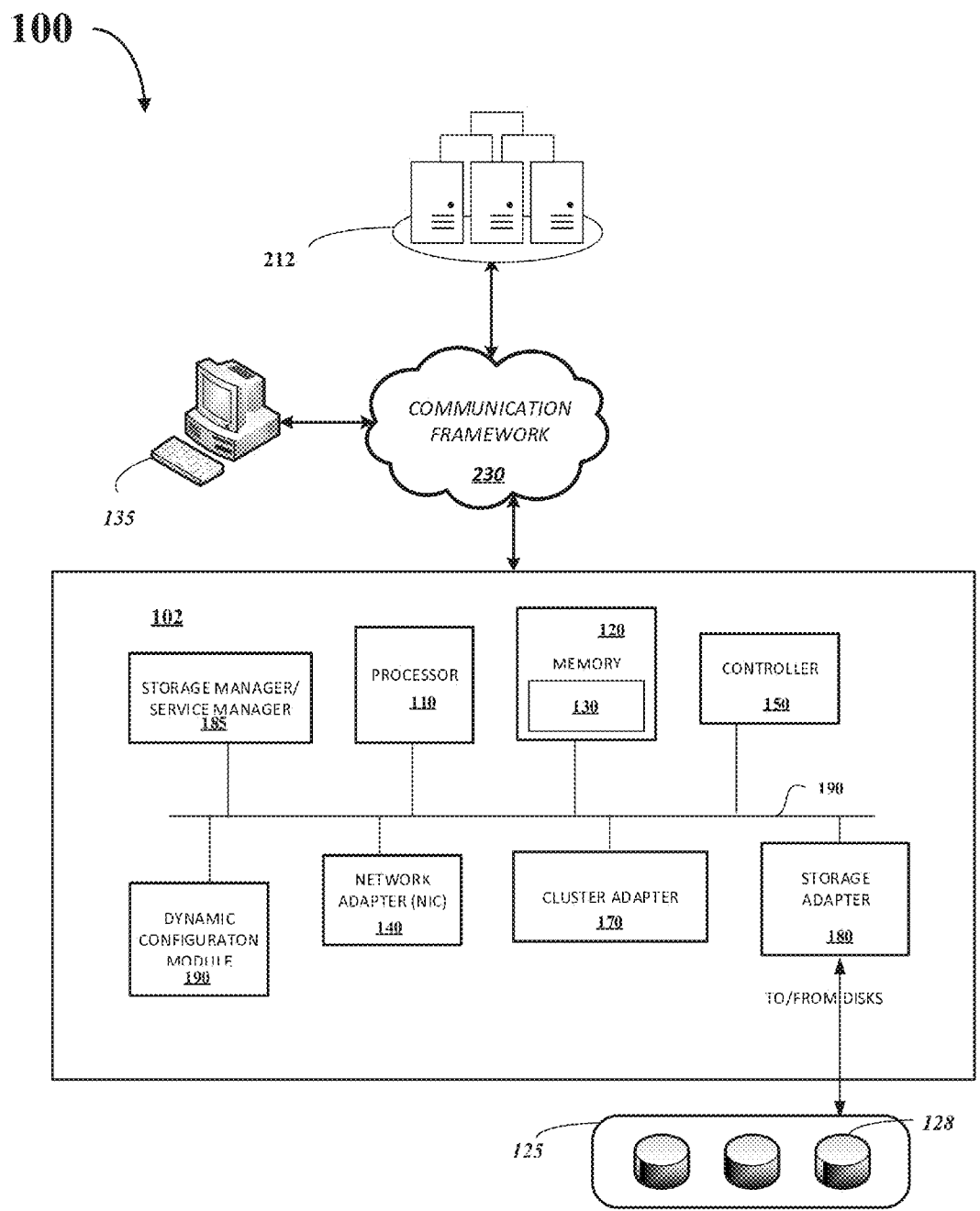
FIG. 1 illustrates an embodiment of a distributed data system.

Various embodiments are generally directed to computer networks that may be organized into clusters of computers running collections of systems and applications. The clusters may include an operating system, such as Data ONTAP® operating system available from NetApp®, Inc. (hereinafter "Clustered DATA ONTAP" or "CDOT"), among others. The operating system may be arranged to simultaneously interface with multiple, third party scanning service components hosted inside or outside of the cluster for scanning data for viruses on a clustered network. Furthermore, the operating system may be arranged to simultaneously interface with a heterogeneous mix of multiple third party antivirus scanning products in an efficient manner by reducing a number of scanning service requests processed by the operating system. The reduction in scanning service requests may be accomplished by defining a valid scanning service response in terms of availability of a particular version of service provider.

In general, the word "virus" refers to a program or piece of code that is loaded onto a computer without the computer user's knowledge and runs against their wishes. Most viruses can also replicate themselves, and the more dangerous types of viruses are capable of transmitting themselves across networks and bypassing security systems. A virus may include malicious code designed to modify software or data accessible by a device. Examples of a virus may include without limitation a computer virus, computer worm, computer time bomb, Trojan horse, malware, or other types of program code with similar effect. A virus may be designed to perform any number of malicious acts directed towards information processed by a device or accessible to a device, such as revealing information, damaging information, destroying information, altering information, replacing information, and so forth. Accordingly, the above described "virus" represent an imminent danger to clients that utilize the data storage and retrieval services provided by a clustered storage system.

Scanners utilized by an antimalware or antivirus support system may be provided "off-box" in that the scanners are provided or hosted on remote computing systems, including, in some cases, systems controlled or provided by a third party vendor. In other words, the scanners that are "off-box" are outside of a computer cluster. Maintaining and honoring the scan status of a file is extremely important particularly for multiple off-box virus scanners connected to the cluster. The operating software of the cluster should thus be able to support multiple off-box virus scanners while honoring a scan-status of a file from multiple third party scanning vendors. Thus, rescanning of a file only occurs when either 1) scan-engines of the multiple third party vendors are modified or 2) upon rolling upgrades of the scan-engines of a single scanning vendor in a multi-host deployment. The restrictions on rescanning should also ensure that the files' scan-status of the data is gradually upgraded from a legacy version to the new version as the rolling upgrade progresses while limiting the increase of scan-request traffic when either a first or a last scanner undergoes an upgrade.

One of the challenges for honoring the scan status is avoiding any unnecessary resetting of the scan status of all files. For example, each of the multiple off-box virus scanners may be running an arbitrary antivirus (AV) scanning software version. As such, any version update from any of the multiple off-box virus scanners may result in resetting the scan status of all files. This in turn results in unnecessary rescanning of data because if N scanners are attached, updating a scanner to newer version of the AV scan database happens N times as often. Beyond forcing a large number of rescanning operations, the actual process of clearing a scan status involves visiting every non-resident ("in-core") data structure. For example, the data structure could be an inode, which may number in the millions. The extra work of visiting every non-resident data structure is a non-trivial performance hit. Embodiments attempt to reduce or avoid such performance hits especially when the scan status is persisted on a disk.

As such, embodiments overcome the disadvantages of the prior art by providing a technique whereby data is scanned for viruses on a clustered storage system with third party scanner device components hosted outside of the cluster by maintaining dynamic configuration information about a multi-host third party scanner device. Various embodiments are directed to a dynamic configuration validation service for scanning files in a cluster of nodes. The dynamic configuration validation service component is operative to validate a scanner version for each one of multiple scanners for scanning a file in a cluster of nodes, maintain the scanner version in a list of valid scanner versions for the multiple scanners, and scan the file by one of the multiple scanners having the scanner version contained in the list of the valid scanner versions. A list of valid scanner versions of a scanner includes vendor information, a scanner version and scanner vendor identification (ID) information. The scanner vendor ID is associated with the scanner vendor and the scanner version. Thus, dynamic configuration validation service validates a scanner version using information contained in the list of valid scanner versions.

In this way, the present disclosure ensures that the scan-status of data is gradually upgraded from a legacy version to the new version as a rolling upgrade progresses while limiting the increase of scan-request traffic when either a first or a last scanner undergoes an upgrade.

In one embodiment, by way of example only, a clustered network system may scan data for viruses on a clustered storage system with third party scanner device components being hosted outside ("off-box") of the cluster by maintaining dynamic configuration information about a multi-host third party scanner device as follows. The clustered network system maintains a list of valid scanner versions in the clustered network system. A file's scan-signature yields and produces the scanner version with which the file was last scanned. Each time a new scanner version is added or upgraded, a unique scanner version identification (ID) is assigned to the scanner version. In one embodiment, for example, the unique scanner version ID is a unique 16-bit identifier. The unique scanner version identification ID is stored with a file scan signature. In one embodiment, the file scan signature on the file is used for indicating a most recent scanner version used to scan the file for determining whether to rescan the file.

If the scanner version derived from the scan signature of the file (herein after "file scan signature") is included in the list of valid scanner versions, the scan-status of the file may be trusted. Any need for rescanning is eliminated. If the scanner version is not located in the list of valid scanner versions, the file must be rescanned. Furthermore, the list of valid scanner-versions is derived from the scanners that are actively performing scan operations in the clustered network system. The scanner connection information is collated from each node of the clustered network system. A count number of the scanner connections per vendor version are maintained in a cluster-wide database of the clustered network system. By correlating the scanner connection information to each vendor version allows for the scanner versions available to the storage cluster be determined and validated at any time.

The list of valid scanner versions may be automatically updated and the collated scanner connection status may be change, which may be executed as follows. In one embodiment, a new valid scanner version may be added to the list of valid scanner versions whenever a connection with new vendor scanner version is received. Also, a valid scanner version may be marked as invalid whenever a last connection for a vendor scanner version disconnects from the clustered network system. More specifically, the scanner version is marked as invalid upon disconnection from the last connected scanner. The scanner version marked as invalid may be scheduled for removal from the list of valid scanner-versions after a predetermined time delay.

Delaying the removal of the scanner version marked as invalid may act as a de-jittering mechanism providing protection to the list of valid scanner-versions from frequent updates in an unstable condition of the clustered network system.

This de-jittering mechanism provides enhanced stability to the clustered network system especially in light of the unique scanner version ID being assigned each time a new vendor scanner version is detected on the cluster. In absence of this de-jittering mechanism, each time the scanner reconnects to the cluster after an intermittent network disruption, the scanner version would be assigned the new 16-bit unique scanner version ID leading to rescanning of the files with scan signatures containing the old 16-bit identifier.

The advantages of the present technique are realized in a reduction of cost and increased performance. The present technique reduces cost by providing a platform whereby third party software vendors may compete to provide the third party software components for the scanning of viruses. Specifically, a clustered storage system is free to acquire the third party components from any one of a number of third party software vendors thereby creating effective competition between third party software vendors. The present technique further increases the performance of the producers of the clustered storage system who may apply engineering resources to subject matter which they have specialized knowledge, the storage and retrieval of data.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates an embodiment of a distributed data system having a storage system 102. In one embodiment, the distributed data system 100 may comprise a computer-implemented system having a software operation application 130 comprising one or more components. The distributed data system 100 in FIG. 1 includes a storage controller 150 in a cluster of nodes. Although the distributed data system 100 shown in FIG. 1 has a limited number of elements in a certain topology, it may be appreciated that the distributed data system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-a may include components 122-1, 122-2, 122-3, 122-4 and 122-5. The embodiments are not limited in this context.

In an exemplary embodiment, the distributed data system 100 includes a processor subsystem that includes one or more processors 110. The distributed data system 100 may comprise a storage controller 150 that may implement one or more of the nodes, such as nodes 210 and 215 in FIG. 2. In one embodiment, the storage controller 150 is a physical processing device that is used to store and retrieve data on behalf of one or more hosts. In an alternative embodiment, the storage controller 150 is a network storage controller that may be configured (e.g., by hardwiring, software, firmware, or any combination thereof) to operate as a storage server that serves one or more clients on a network, to store and manage data in a set of mass storage devices, such as magnetic or optical storage-based disks or tapes. The distributed data system 100 further includes a memory 120, a network adapter 140, a cluster access adapter 170 and a storage adapter 180, all interconnected by an interconnect 190. The cluster access adapter 170 includes a multiplicity of ports adapted to couple one or more nodes together. For example, the cluster access adapter 170 may connect node 210 nodes 215 in FIG. 2. A variety of clustering protocols and interconnect media may be utilized within the cluster architecture described herein.

The distributed data system 100 may be embodied as a single- or multi-processor storage system executing a storage operating system 130 that preferably implements a high-level module, such as a storage manager 185, to logically organize the information as a hierarchical structure of named directories, files and special types of files called virtual disks. Illustratively, one or more processors, such as processor 110, may execute the functions of the nodes in the cluster of nodes.

The memory 120 illustratively comprises storage locations that are addressable by the processors and adapters 140, 170, 180 for storing software program code and data structures associated with the present invention. The processor 110 and adapters may, in turn, comprise processing elements and/or logic circuitry configured to execute the software code and manipulate the data structures. The storage operating system 130 may include portions of which may be resident in memory and executed by the processors(s) 110. The storage operating system 130 may functionally organize the distributed data system 100 by configuring the processor(s) 110 to invoke storage operations in support of the storage service provided by a node. It will be apparent to those skilled in the art that other processing and memory implementations, including various computer readable storage media, may be used for storing and executing program instructions pertaining to the technique introduced here.

The network adapter 140 is in communication with one or more clients 135. The communication may occur over one or more types of the communication framework 230 or communication network. The network adaptor 140 includes a multiplicity of ports to couple the distributed data system 100 to one or more clients 135 over point-to-point links, wide area networks, virtual private networks implemented over a public network (Internet) or a shared local area network. The network adapter 140 thus can include the mechanical, electrical and signaling circuitry needed to connect the distributed data system 100 to a network.

The storage adapter 180 cooperates with the storage operating system 130 to access information requested. The information may be stored on any type of attached array 125 of writable storage media 128, such as magnetic disk or tape, optical disk (e.g., CD-ROM or DVD), flash memory, solid-state disk (SSD), electronic random access memory (RAM), micro-electro mechanical and/or any other similar media adapted to store information, including data and parity information. However, as illustratively described herein, the information is stored on disks 128.

The dynamic configuration module 190, which is a dynamic configuration validation service component, is in communication with processor 110 and other components of the distributed data system 100. The dynamic configuration module 190 allows for multiple scanners on a non-cluster host to scan data and/or files within the distributed data system 100 (e.g., a cluster). The dynamic configuration module 190 validates a scanner version for each one of multiple scanners for scanning a file in a cluster of nodes, maintains the scanner version in a list of valid scanner versions for the multiple scanners, and assists with the scanning of the file by one of the multiple scanners having the scanner version contained in the list of the valid scanner versions. The dynamic configuration module 190 includes the list of valid scanner versions.

Storage of information can be implemented as one or more storage volumes that include a collection of physical storage disks cooperating to define an overall logical arrangement of volume block number (VBN) space on the volume(s). The disks can be organized as a RAID group 125. One or more RAID groups 125 together form an aggregate. An aggregate can contain one or more volumes/file systems.

The storage operating system 130 facilitates clients' access to data stored on the disks. In certain embodiments, the storage operating system 130 implements a write-anywhere file system that cooperates with one or more virtualization modules to "virtualize" the storage space. In the illustrative embodiment, the storage operating system 130 is a version of the Data ONTAP® operating system available from NetApp®, Inc. and the storage manager 185 implements the Write Anywhere File Layout (WAFL®) file system. However, other storage operating systems are capable of being enhanced or created for use in accordance with the principles described herein.

Moreover, the distributed data system 100 is in communication with one or more multiple third party scanner devices 212 connected to the storage system 102. Each multiple third party scanner devices 212 communicates via the communication framework 230 with the storage system 102.

Figure 2:
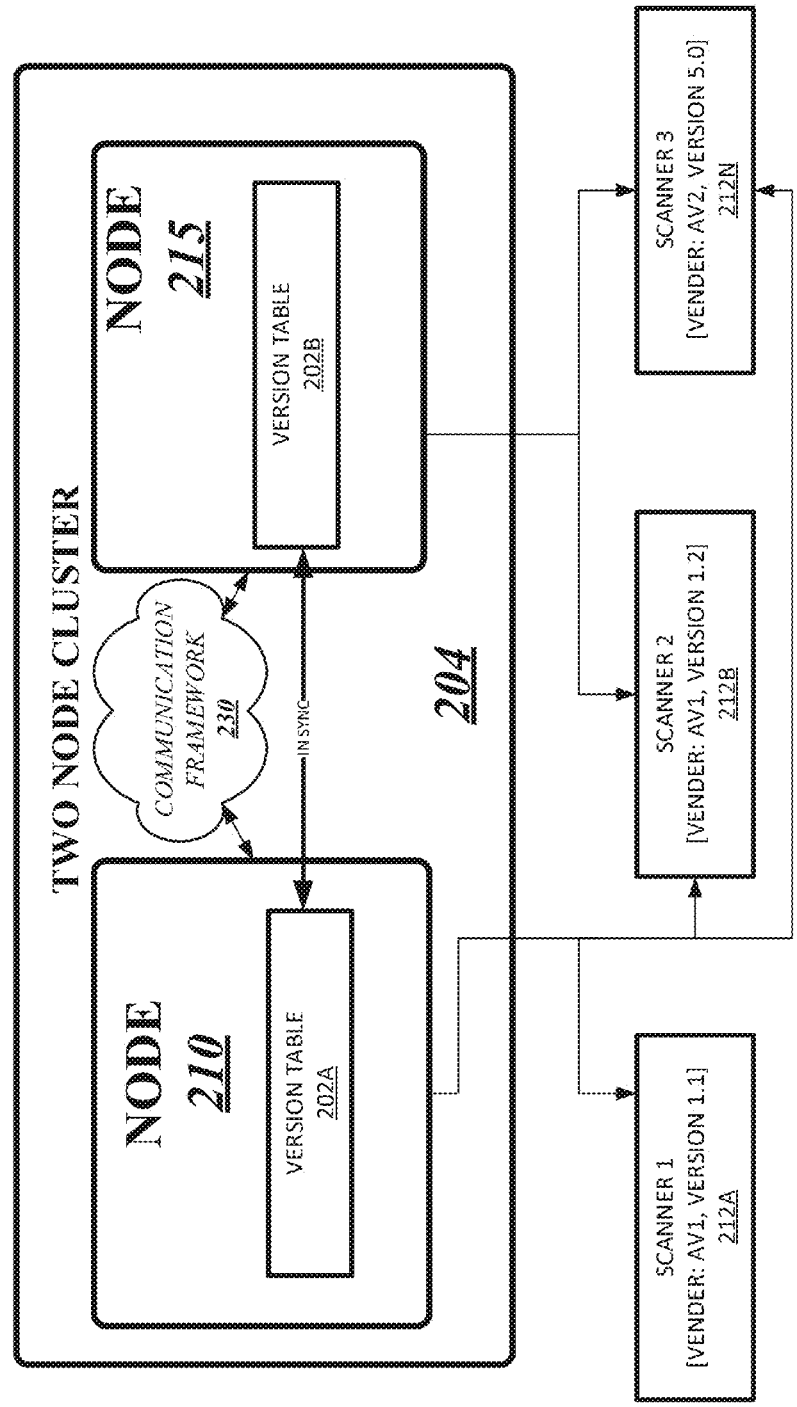
FIG. 2 illustrates an embodiment of maintaining dynamic configuration and verification information for scanner devices hosted outside a cluster of nodes of the distributed data system.

FIG. 2 illustrates an embodiment of maintaining dynamic configuration and verification information for scanner devices hosted outside a cluster of nodes of the distributed data system. The cluster 200 is a cluster of computing systems coupled together by one or more communication frameworks 230, such as network 130. In one embodiment, by way of example only, the cluster 200 may be a two-node cluster 204. One or more storage controllers 150 may implement the nodes 210, 215. Each node 210, 215 may be a storage server functioning and operating in one or more of the storage systems 102. The cluster 200 is configured to maintain dynamic configuration information about a multi-host off-cluster service on a cluster as described herein. The nodes 210, 215 automatically configures cluster paths based on configuration information shared in the cluster 200.

The cluster 200 is configured to maintain dynamic configuration information about a multi-host off-cluster service on a cluster as described herein. The nodes 210, 215 include a version table 202A, 202B (herein after collectively referred to as "version table 202") that are in synch with each other. The version table 202A, 202B of each node 210, 215 include a list of valid scanner versions of a scanner having scanner vendor identification (ID) information (labeled as vender: AV1 or AV2) and a scanner vender version (labeled as Version 1.1, 1.2, and/or 5.0). In one embodiment, the cluster 200 is in communication with multiple third party scanner devices (herein after collectively referred to as "multiple third party scanner devices 210").

For example, the multiple third party scanner devices 212 are connected to the cluster 200. Each multiple third party scanner devices 212 includes both the scanner vendor ID (labeled as vender: AV1 or AV2) and the scanner vender version (labeled as Version 1.1, 1.2, and/or 5.0). The scanner vendor ID for Scanner 1 212A indicates that the vender is AV1 and the scanner version is 1.1. The scanner vendor ID for Scanner 2 212B indicates that the vender is AV1 and the scanner version is 1.2. The scanner vendor ID for Scanner 3 212N indicates that the vender is AV2 and the scanner version is 5.0.

After a file is scanned, the scanner version ID of the scanner that performed the scan is stored in an in-core inode of the file. In other words, the scanner version ID is stored in a scan signature of a file. Later, if a request comes in to access that file, ONTAP can look at the on-disk version ID and see if any connected scanner exists which has that particular scanner version ID. If so, the scan results, such as clean/or infected, are considered valid, and no further scan is required. If there is no connected scanner with a scanner version ID identical to the on-disk version ID, a new scan request is triggered. It should be noted that the on-disk version ID may be considered the same as the file scan signature. The file scan signature of a file includes the scan status (e.g., a status of clean or infected) and the scanner version ID with which the file is scanned.

FIG. 3A illustrates an embodiment of version table of FIG. 2. In FIG. 3, a version table 202 includes 5 rows and 5 columns. Row 20 illustrates the name of the columns. The first column 302 is the name of the third party scanner vendor. The second column is the scanner version. The third column 306 is the scanner version identification, such as a unique 16-bit identifier scanner version ID. The fourth column 308 is the connection counter 308, and the fourth column 310 is the timeout period, if any. In other words, row 20 categorizes the version table 202 with the vendor listed in column 302, the scanner version listed in column 304, the scanner version identification (ID) listed in column 306, the connection count indicating how many times the scanner version is connected to the cluster listed in column 308, and a timeout, if any, listed in column 310.

More specifically, the scanner version ID 306 is associated with a specific third party vendor 302 and scanner version 304. In other words, the scanner version ID 306 is associated with the scanner vendor ID 302 and the scanner vendor version 304. In one embodiment, when a scan engine of a scanner from a vendor 302 registers with the nodes 210, 215, the vendor 302 and scanner version 304 includes both the scanner vendor ID (also referred to hereafter a "vendor ID") 302 identifying the scanner vendors 302 company and/or product, plus the scanner vendor version (herein after "scanner version") 304, which may be a string consisting of a two-version number, such as "x.y". The combination of the vendor ID or scanner vendor 302 and the scanner version 304 is used to search for scanner version ID 306 in the version table 202.

The scanner version ID 306 may be a number that nodes 210, 215 use to identify a combination of both the vendor 302 and scanner version 304. The scanner version ID 306 is included in the version table 202 and is used after a file is scanned to identify which vendor 302 and scanner version 304 combination has performed the scan. Future accesses to a file will not trigger a scan if there is a currently connected scanner with a matching scanner version ID 306.

The version table 202 is a database that the node 210, 215 maintains which maps a vendor and scanner version combination to a scanner version ID. For example, the nodes 210, 215 use operation software, such as DATA ONTAP, to maintain the version table 202. The version table 202 keeps track of how many scanners are currently connected which have the same vendor 302 and scanner version 304 combination, and hence, the same scanner version ID 306.

The version table 202 collates connection information of the scanner version 304 for each one of multiple scanners from each node in the cluster 200 in the list of the valid scanner versions. The version table 202 may be the list of valid scanner version. For example, row 20 is categorizes the list or table with the vendor listed in column 302, the scanner version listed in column 304, the scanner version ID listed in column 306, the connection count indicating how many times the scanner version is connected to the cluster is listed in column 308, and a timeout, if any, is listed in column 310.

For example, row 30 indicates a first scanner is from a third party scanner vendor 302 generically represented as AV1 for illustration purposes, the scanner version 304 is 1.0, the scanner version ID 306 is 9, the connection count 308 is zero (0), and a timeout period of 12 hours (H). Row 40 indicates a second scanner is from a third party scanner vendor 302 generically represented as AV1 for illustration purposes, the scanner version 304 is 1.1, the scanner version ID 306 is 11, the connection count 308 is 1, and there is no timeout period. Row 50 indicates a third scanner is from a third party scanner vendor 302 generically represented as AV1 for illustration purposes, the scanner version 304 is 1.2, the scanner version ID 306 is 12, the connection count 308 is 2, and there is no timeout period. Row 60 indicates a fourth scanner is from a third party scanner vendor 302 generically represented as AV2 for illustration purposes, the scanner version 304 is 5.0, the scanner version ID 306 is 10, the connection count 308 is 2, and there is no timeout period.

The scanner version 304 may be derived from the file's scan signature and is included in version table 202, which is a list of valid scanner versions. If the scanner version 304 is included in the version table 202, the scan-status of the file may be trusted. Any need for rescanning is eliminated. If the scanner version 304 is not located in the in version table 202, the file must be rescanned. Furthermore, the version table 202 is derived, generated, and/or maintained from the scanners that are actively performing scan operations in the cluster 200. The scanner-connection information, such as the connection count 308, is collated from each node 201, 215 of the cluster 200. The connection count 308 of the scanner connections per vendor version is maintained in in the version table 202 of the cluster 200. By correlating the scanner connection information, such as the connection count 308, to each vendor version, such as scanner version 304, allows for the scanner versions 304 available to the cluster 200 be determined and validated at any time.

The vendor table 202 may be automatically updated and the collated connection-status may be changed. For example, a new valid scanner version 304 may be added to the vendor table 202 whenever the cluster 200 receives a connection with the new scanner version 304. Also, a valid scanner version 304 may be marked as invalid whenever a last connection for a scanner version 304 disconnects from the cluster 200. The scanner version 304 marked as invalid may be scheduled for removal from the version table 202 after a predetermined time delay.

Delaying the removal of the scanner version 304 marked as invalid may act as a de-jittering mechanism providing protection to the version table from frequent updates in an unstable condition of the cluster 200.

This de-jittering mechanism provides enhanced stability to the cluster 300 especially in light of the unique scanner version ID being assigned each time a new scanner version 304 is detected and used in the cluster 200. In absence of the de-jittering mechanism, each time the scanner reconnects to the clustered network system after an intermittent network disruption it will be assigned a new 16-bit unique scanner version ID. This will lead to rescanning of the files with scan signatures containing the old 16-bit identifier.

FIG. 3B-3I illustrate embodiments for a sequence of events for maintaining dynamic configuration information using version table 202 of FIG. 2 and embodiments of FIGS. 4-7. Consider the following example illustrating the embodiments described herein. In FIG. 3B, assume Scanner 1 connects with the cluster 200 with the vendor being "ScanMaster" 302 and the scanner version being "v5.643" (herein after combined as "ScanMaster v5.643") 304. Assume there is no entry in the version table 202 for the vendor "ScanMaster" and the scanner version "v5.643". Thus, a new scanner version ID is chosen, such as scanner version ID "52". The version table 202 enters a new row 30 indicating Scanner 1 is from a third party scanner vendor 302 represented as ScanMaster and the scanner version 304 is v5.64, the scanner version ID 306 is 52, the connection count 308 is 1, and a timeout period 310 of never. Assume files "a", "b", and "c" are scanned by Scanner 1. The scan signature and/or scanner version ID 306 for files "a", "b", and "c" may be 52.

Building on FIG. 3B, assume in FIG. 3C, scanner 2 connects with the cluster 200 with the vendor 302 being "ScanMaster" and the scanner version 304 being "v5.644" (herein after combined as "ScanMaster v5.644"). Again, assume no entry exists for "ScanMaster" and the scanner version "v5.644" in the version table 202. A new scanner version ID 306 is created, such as scanner version ID "53". The version table 202 enters a another new row 40 indicating Scanner 2 is from a third party scanner vendor 302 represented as "ScanMaster." The scanner version 304 is represented as "v5.644" and the scanner version ID 306 is 53 with a connection count 308 as 1 and a timeout period 310 of "never." Assume files "x", "y", and "z" are scanned by 2. The scan signature and/or scanner version ID 306 for files "x", "y", and "z" may be 53.

Building on FIGS. 3B and 3C, assume now in FIG. 3D Scanner1 sends a scanner version 304 update to "5.644". The row 30 entry for scanner version 304 of Scanner1 with "ScanMaster v5.643" will have the connection count reduced to zero, and row 40 entry for scanner version 304 of scanner 2 with "ScanMaster v5.644" will increase to 2. Assume now a request to access file "a" arrives in the cluster with a scanner version ID of 52. The request will trigger a scan operation because no active scanner exists which has a scanner version ID 306 of 52. The timeout 308 of row 1 now indicates a timeout 310 of over 12 hours.

Turning now to FIG. 3E and continuing from FIG. 3D, assume one hour later, scanner3 connects with the cluster 200 with the vendor 302 being "ScanMaster" and the scanner version 304 being "v5.643" (herein after combined as "ScanMaster v5.643"). Because row 30 in the version table 202 includes a pre-existing entry for "ScanMaster v5.643" the connection count 308 may be increased to 1 rather than a new row being added. The scanner version ID 306 will remain 52. Assume now a request to access file "b" arrives in the cluster, which has an scanner version ID 306 is 52. A scan operation will not be triggered because there is now an active scanner exists which has a scanner version ID 306 of 52.

Building on FIG. 3E, assume now in FIG. 3F Scanner 1 in row 40 disconnects from the cluster 200 because a host it is running on shuts down. The Scanner 1 connection count 308 in row 40 for the vendor 302 being "ScanMaster" and the scanner version 304 being "v5.644" (e.g., "ScanMaster v5.644") is decremented, yielding a count of 1. Assume now a request to access file "x" arrives in the cluster 200, which has an scanner version ID 306 is 53. A scan operation will not be trigger because there is now an active scanner (e.g., Scanner 1 in row 40) exists that has a scanner version ID 306 of 53.

Building on FIG. 3E, assume now two hours later in FIG. 3G, Scanner1 reconnects with an updated vendor 302 being "ScanMaster" and the scanner version 304 being "v5.650" (herein after combined as "ScanMaster v5.650"). Because there is no row entry in the version table 202 for "ScanMaster v5.650", the version table 202 enters a new row, such as row 50, indicating Scanner 1 is from scanner vendor 302 represented as ScanMaster and the scanner version 304 represented as v5.650. The scanner version ID 306 is assigned as 54 to ScanMaster v5.650".

Shortly thereafter as illustrated in FIG. 3H, Scanner 2 and Scanner 3 both update to the scanner version 304 v5.650 (e.g. "ScanMaster v5.650") as indicated in row 50 with the connection count 308 increasing from 1 as illustrated in FIG. 3G to a connection count 308 of 3 as illustrated in FIG. 3H. At this point, any files that have not been scanned by a scanner with scanner version ID 306 of 54 (before that, only Scanner 1) will trigger a scan, since that is the only scanner version ID 306 that include active scanners, such as Scanner 1-3. The timeout are of row 1 and row 2 now indicate a timeout 310 of over 12 hours.

Assume, the next day as illustrated in FIG. 3I, Scanner 4 connects to the cluster 200 from a different vendor. The vendor 302 being "MalAway" and the scanner version 304 being "v5349.5549078" (herein after combined as "MalAway v5349.5549078"). A new scanner version ID 306 is allocated as 55.

It should be noted that since over 12 hours have passed as illustrated in timeout 310 of row 30 and row 40 of FIG. 3H, the row entries, row 30 and row 40, for "ScanMaster v5.643" and "ScanMaster v5.644" have timed out and are removed from the version table 202. If a scanner were to reconnect with one of those versions (e.g., "ScanMaster v5.643" and "ScanMaster v5.644"), the new scanner would be assigned a new scanner version ID, and treated like any other vender and scanner version combination.

As such, a new row 60 entry may be created for the new scanner since the version table 202 does not include the new scanners vendor 302 information and/or the scanner version 304 of the Scanner 4. (At this point there are only 2 rows, such as rows 50 and row 60, in the version table 202 of FIG.

3I). Again, any file with an scan signature and/or scanner version ID 54 corresponding to any connected scanner will be considered as having been scanned, and will not trigger a rescan. The vender and scanner version combination may be used as an opaque key.

The embodiments are not limited to this example.

Figure 4:
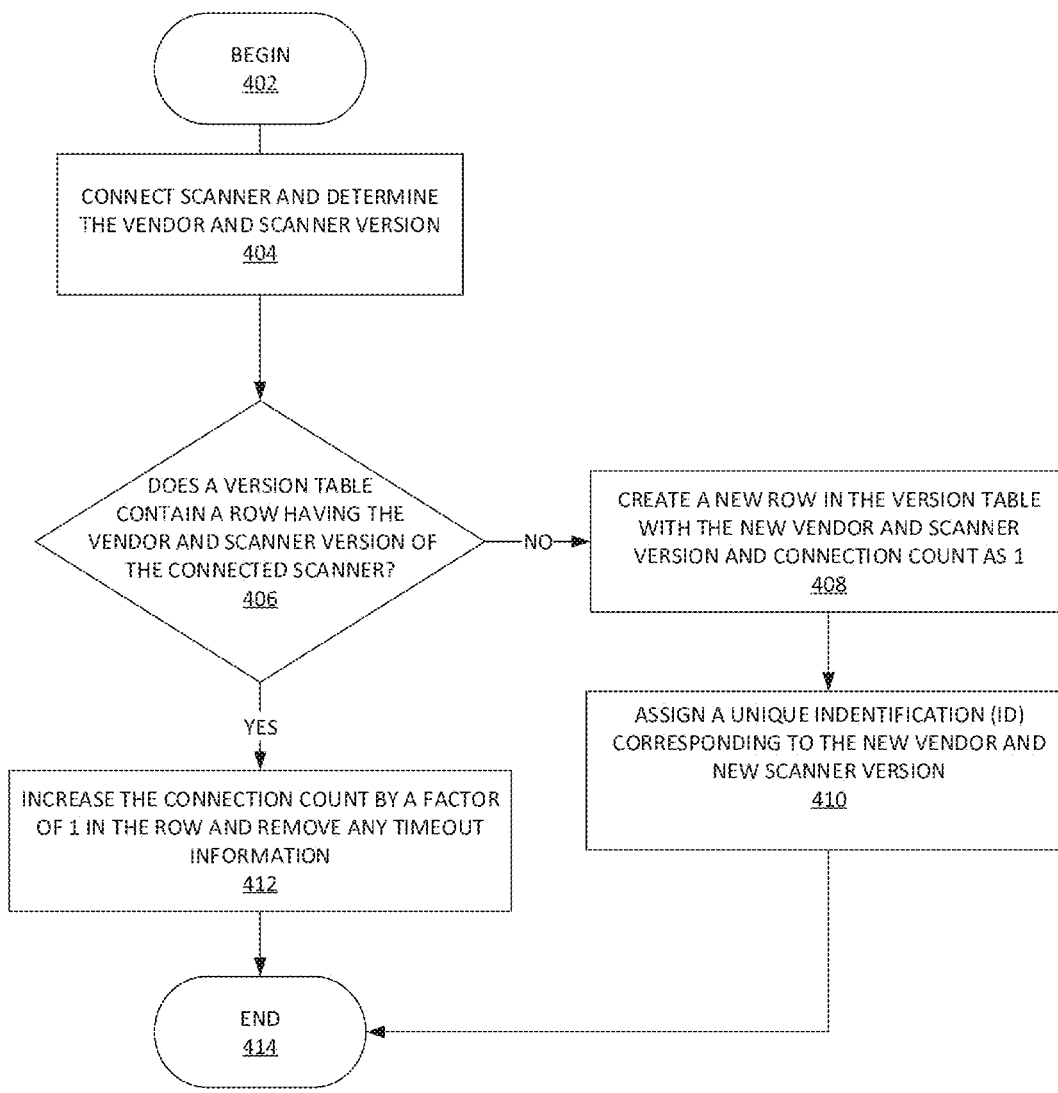
FIG. 4 illustrates an embodiment of a detailed logic flow for connecting a scanner device to a cluster of nodes of FIG. 2.

FIG. 4 illustrates an embodiment of a detailed logic flow 400 for connecting a scanner device to a cluster of nodes of FIGS. 2-3. In the illustrated embodiment shown in FIG. 4, the logic flow 400 may begin at block 402. The logic flow then proceeds to block 404. The logic flow 400 connect a scanner to the cluster 200 and determines the identity of the third party vender and scanner version of the scanner at block 404.

The logic flow 400 determines if a version table 202 contains a row having the vendor 302 and scanner version 304 of the connected scanner at block 406. If the version table 202 does not have the vendor 302 and scanner version 304, the logic flow 400 creates a new row in the version table 202 with the new vendor 302 and scanner version 304 and connection count 308 as 1 at block 408. The logic flow 400 assigns a unique 16-bit identifier scanner version ID (e.g., scanner version ID 308 of FIG. 3A) corresponding and relating to the new vendor 302 and scanner version 304 information at block 410

If the version table 202 does have the vendor 302 and scanner version 304, the logic flow 400 increases the connection count 308 by a count of 1 in the row and removes any time out information at block 412. The logic flow 400 may end at block 414.

The embodiments are not limited to this example.

Figure 5:
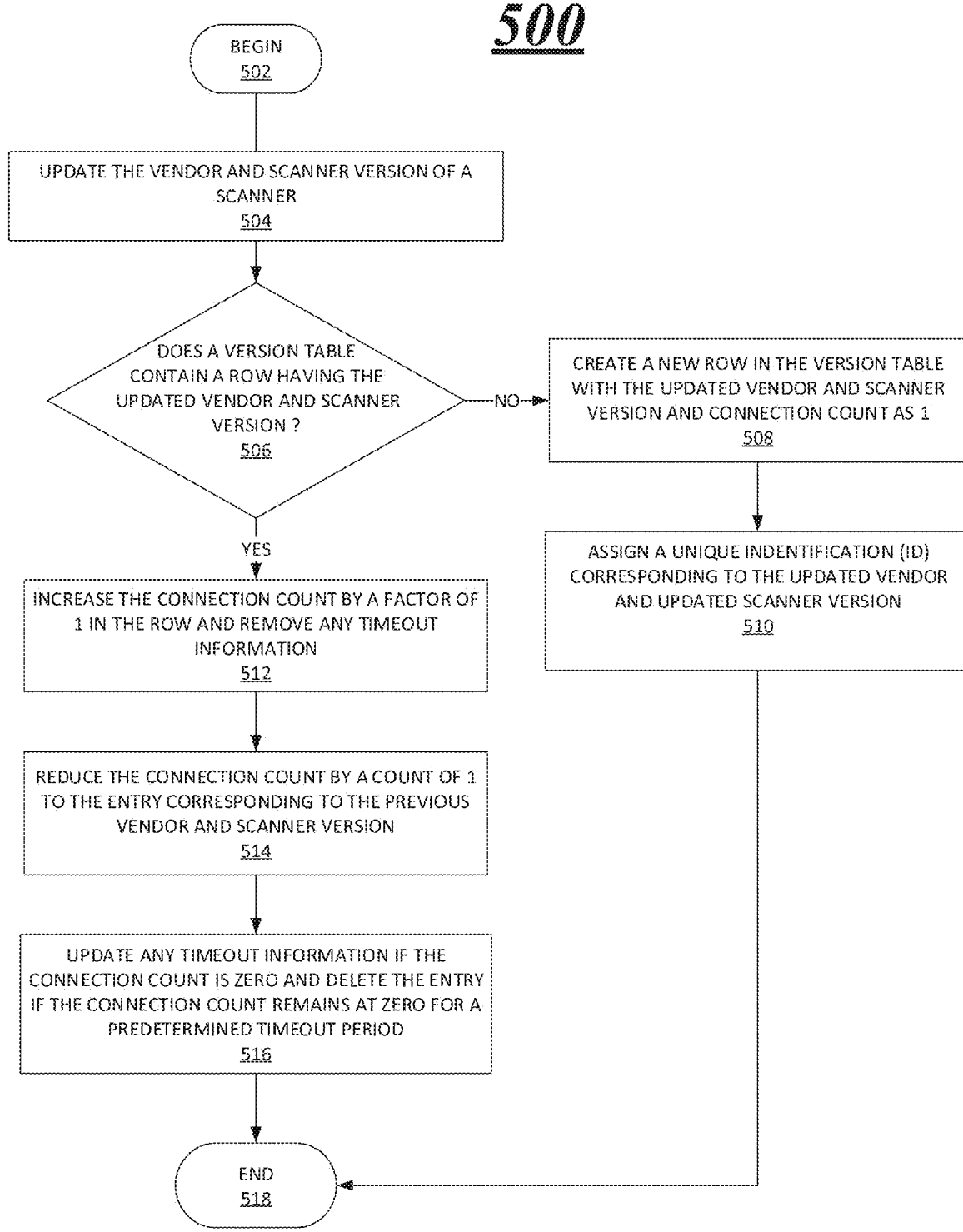
FIG. 5 illustrates an embodiment of a detailed logic flow for updating a scanner device to a cluster of nodes of FIG. 2.

FIG. 5 illustrates an embodiment of a detailed logic flow 500 for updating a scanner device to a cluster of nodes of FIGS. 2-3. In the illustrated embodiment shown in FIG. 5, the logic flow 500 may begin at block 502. The logic flow then proceeds to block 504. The logic flow then proceeds to block 504. The logic flow 500 updates the vender (third party) 302 and scanner version 304 of a scanner at block 504. The logic flow 500 determines if a version table 202 contains a row having the updated vendor 302 and scanner version 304 of the connected scanner at block 506. If the version table 202 does not have the vendor 302 and scanner version 304, the logic flow 500 creates a new row in the version table 202 with the updated vendor 302 and scanner version 304 and connection count 308 as 1 at block 508. The logic flow 500 assigns a unique 16-bit identifier scanner version ID 306 corresponding and relating to the updated vendor 302 and scanner version 304 at block 510.

If the version table 202 does have the vendor 302 and scanner version 304, the logic flow 500 increases the connection count by a count of 1 in the row and removes any timeout 310 information at block 512. The logic flow 500 reduces the connection count 308 by a count of 1 to the entry in the version table 202 corresponding to the previous vendor 302 and scanner version 304 at block 514. The logic flow 500 updates any timeout 310 information if the connection count 308 is zero (0) and deletes the entry in the version table 202 if the connection count 308 of the scanner remains at zero for a predetermined timeout 310 period at block 516. The logic flow 500 may end at block 518.

The embodiments are not limited to this example.

Figure 6:
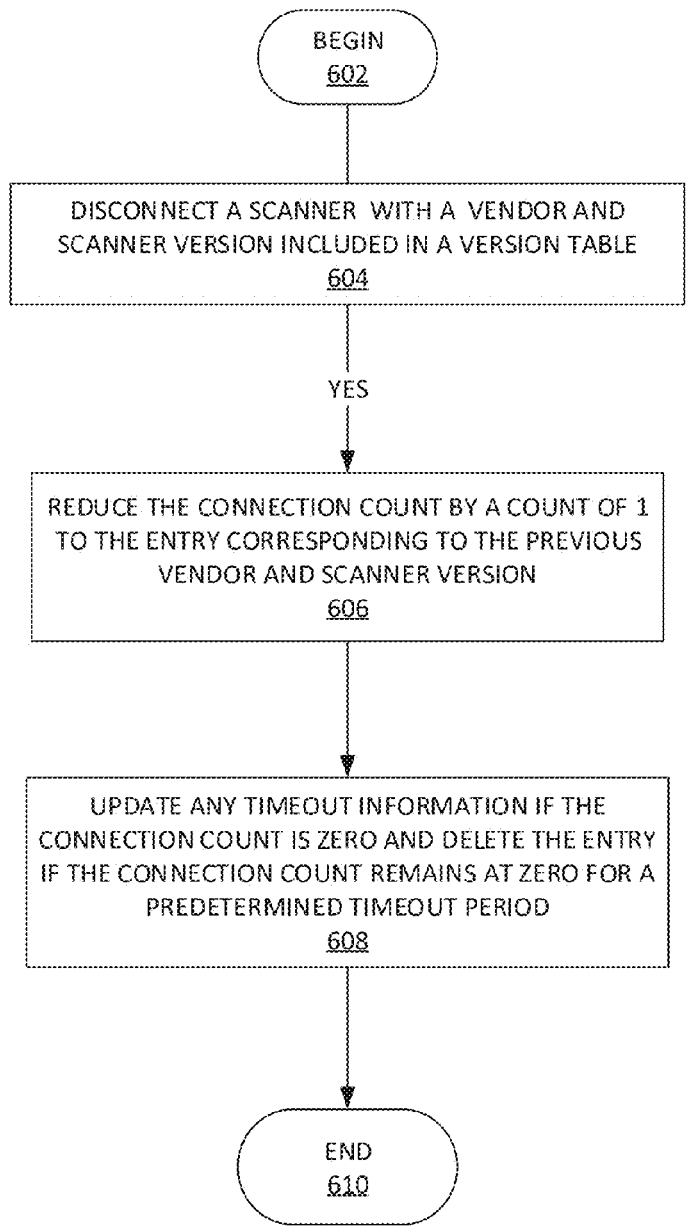
FIG. 6 illustrates an embodiment of a detailed logic flow for disconnecting a scanner device to a cluster of nodes of FIG. 2.

FIG. 6 illustrates an embodiment of a detailed logic flow 600 for disconnecting a scanner device to a cluster of nodes of FIG. 2. In the illustrated embodiment shown in FIG. 6, the logic flow 600 may begin at block 602. The logic flow 600 then proceeds to block 604. The logic flow 600 disconnects a scanner from the cluster 200 at block 604. The logic flow 600 reduces the connection count 308 by a count of one (1) to the entry in the version table 202 corresponding to a previous vendor 302 and scanner version 304 at block 606. The logic flow 600 updates any timeout 310 information if the connection count 308 is zero (0) and deletes the entry in the version table 202 if the connection count 308 of the scanner remains at zero for a predetermined timeout 310 period at block 608. The logic flow 500 may end at block 610. The embodiments are not limited to this example.

Figure 7:
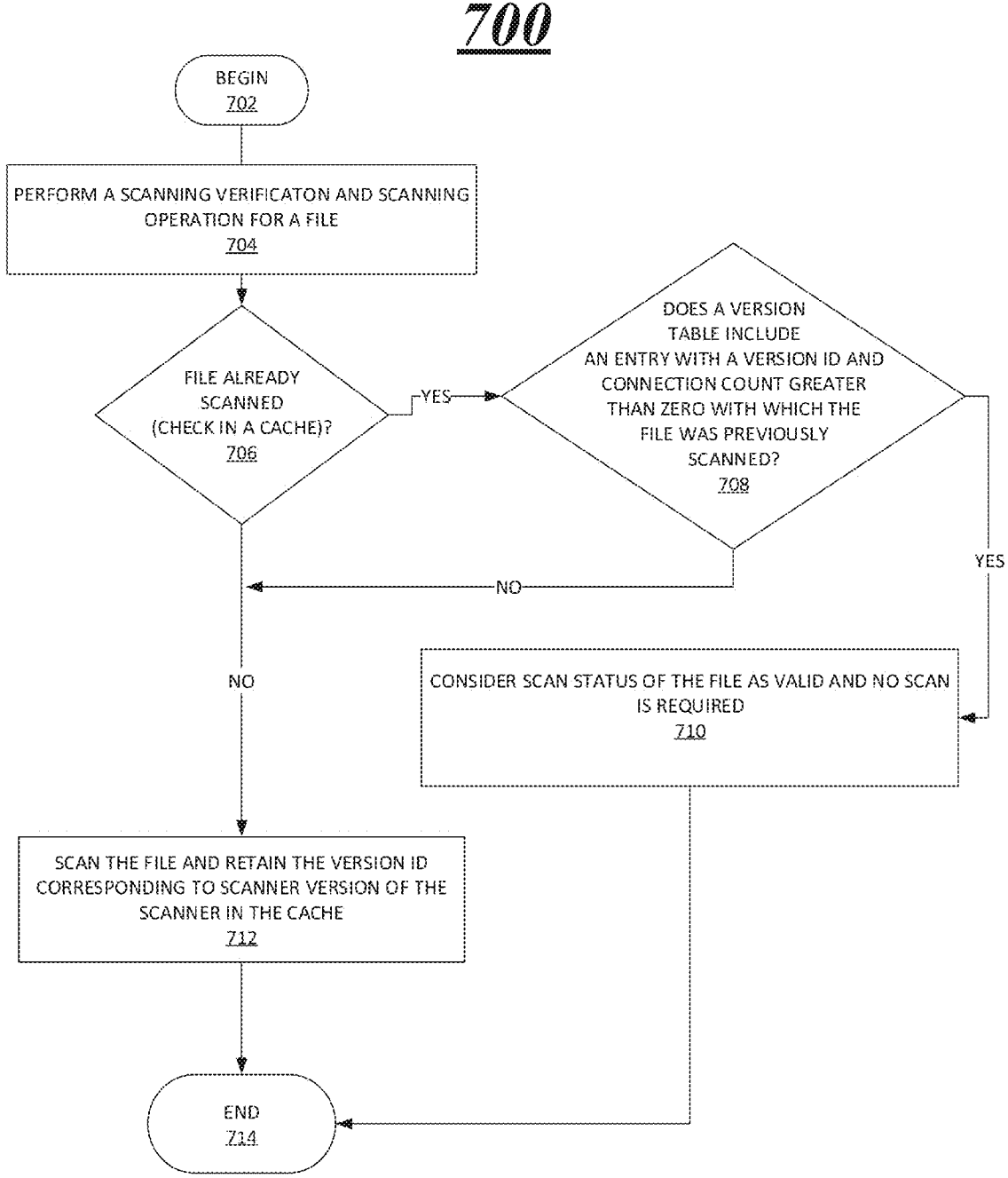
FIG. 7 illustrates an embodiment of a detailed logic flow for executing a scanning operation of a file using a scanner device to a cluster of nodes of FIG. 2.

FIG. 7 illustrates an embodiment of a detailed logic flow for executing a scanning operation of a file using a scanner device to a cluster of nodes of FIGS. 2-3. In the illustrated embodiment shown in FIG. 7, the logic flow 700 may begin at block 702. The logic flow 700 then proceeds to block 704. The logic flow 700 may perform a scanning verification and scanning operation for a file at block 704. The logic flow 700 determines if the file has previously been scanned by checking in a cache at block 706. It should be noted that the cache contains the file scan signature of the scanned files. If no, the logic flow 700 moves to block 712. The logic flow 700 scans the file and retains the scanner version ID 306 corresponding to the scanner version 304 in the cache at block 712. The scanner version ID 306 may be a unique 16-bit scanner version identifier. The unique scanner version identification ID 306 is stored with a scan signature of the file.

If the file has been previously scanned, the logic flow 700 determines if a version table 202 includes an entry with a scanner version ID 306 and a connection count 308 that is greater than zero (0) with which the file was previously scanned at block 708. If no, the logic flow moves to block 712. If yes, the logic flow 700 the scan status of the file is considered as valid and no scan is required at block 710. The scan status of the file is set and maintained as valid. The logic flow 700 may move to block 714. The logic flow 700 may end at block 714.

The embodiments are not limited to this example.

Thus, as described herein, various embodiments are directed to can data files for viruses on the cluster 200 with the multiple third party scanner devices 212 being hosted outside of the cluster 200 by maintaining dynamic configuration information about a multi-host third party scanner device as follows. The cluster 200 maintains a list of valid scanner versions in the version table 202 in the cluster 200. A file's scan-signature yields and produces the scanner version with which the file was last scanned. Each time a new scanner version is added or upgraded, a unique scanner version identification (ID) is assigned to the scanner version. The unique scanner version ID is a unique 16-bit identifier.

Moreover, the present disclosure provides a unique, resilient, easy-to-implement solution for problems faced in the inter-workings of a storage cluster with non-cluster services. The present disclosure allows the storage cluster to efficiently use services provided by non-cluster hosts while allowing these hosts to maintain their own schedule of upgrades, with no prior co-ordination of such events with storage cluster operations.

Figure 8:
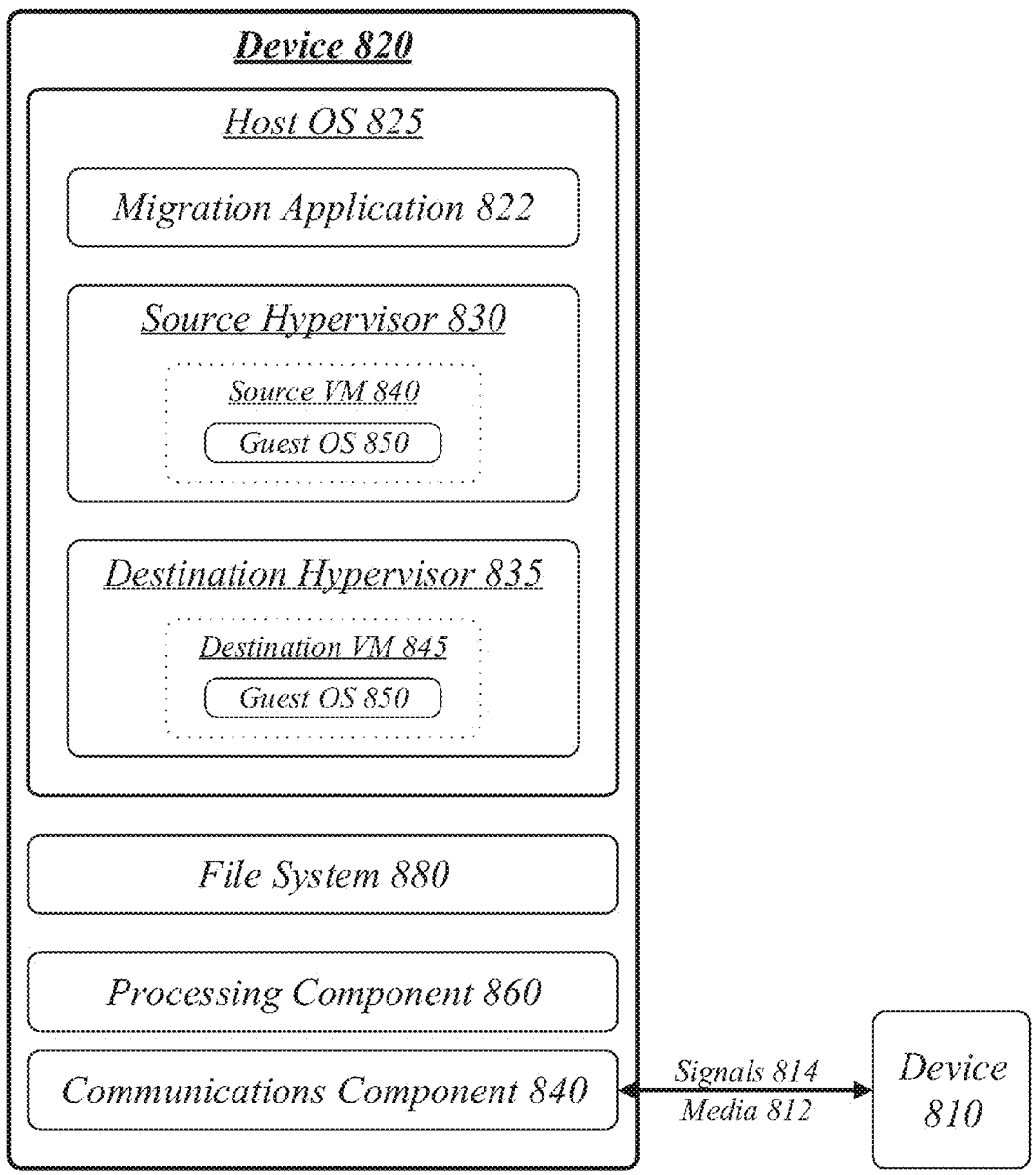
FIG. 8 illustrates an embodiment of a centralized system for the virtual machine migration system of FIG. 1.

FIG. 8 illustrates a block diagram of a centralized system 800. The centralized system 800 may implement some or all of the structure and/or operations for the distributed data system 100 having one or more clusters 200.

The device 820 may comprise any electronic device capable of receiving, processing, and sending information for the centralized system 800. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 820 may execute processing operations or logic for the centralized system 800 using a processing component 860. The processing component 860 may comprise various hardware elements, software elements, or a combination of both.

Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 820 may execute communications operations or logic for the centralized system 800 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 820 may communicate with a device 810 over a communications media 812 using communications signals 814 via the communications component 840. The device 810 may be internal or external to the device 820 as desired for a given implementation.

The device 820 may host a host operating software (OS), a host 825 running a migration application 822, source hypervisor 830, and destination hypervisor 835, with the source VM 140 and destination VM 845 provided by the respective hypervisors 830, 835. The device 820 may also host the file system 880 storing the virtual disk blocks for the source VM virtual disk and destination VM virtual disk. The migration application 822 may perform the migration of the guest OS 850 from the source VM 840 to the destination VM 845 on the device 820.

The device 810 may provide support or control for the migration operations of the migration application 822 and/or the hosting operations of the device 820 and host 825. The device 810 may comprise an external device externally controlling the device 820, such as where device 810 is a server device hosting the guest OS 850 and the device 810 is a client administrator device used to administrate device 810 and initiate the migration using migration application 822. In some of these cases, the migration application 822 may instead be hosted on the device 810 with the remainder of the virtual machine migration system 100 hosted on the device 820. Alternatively, the device 810 may have hosted the migration application 822 as a distribution repository, with the migration application 822 downloaded to the device 820 from the device 810.

Figure 9:
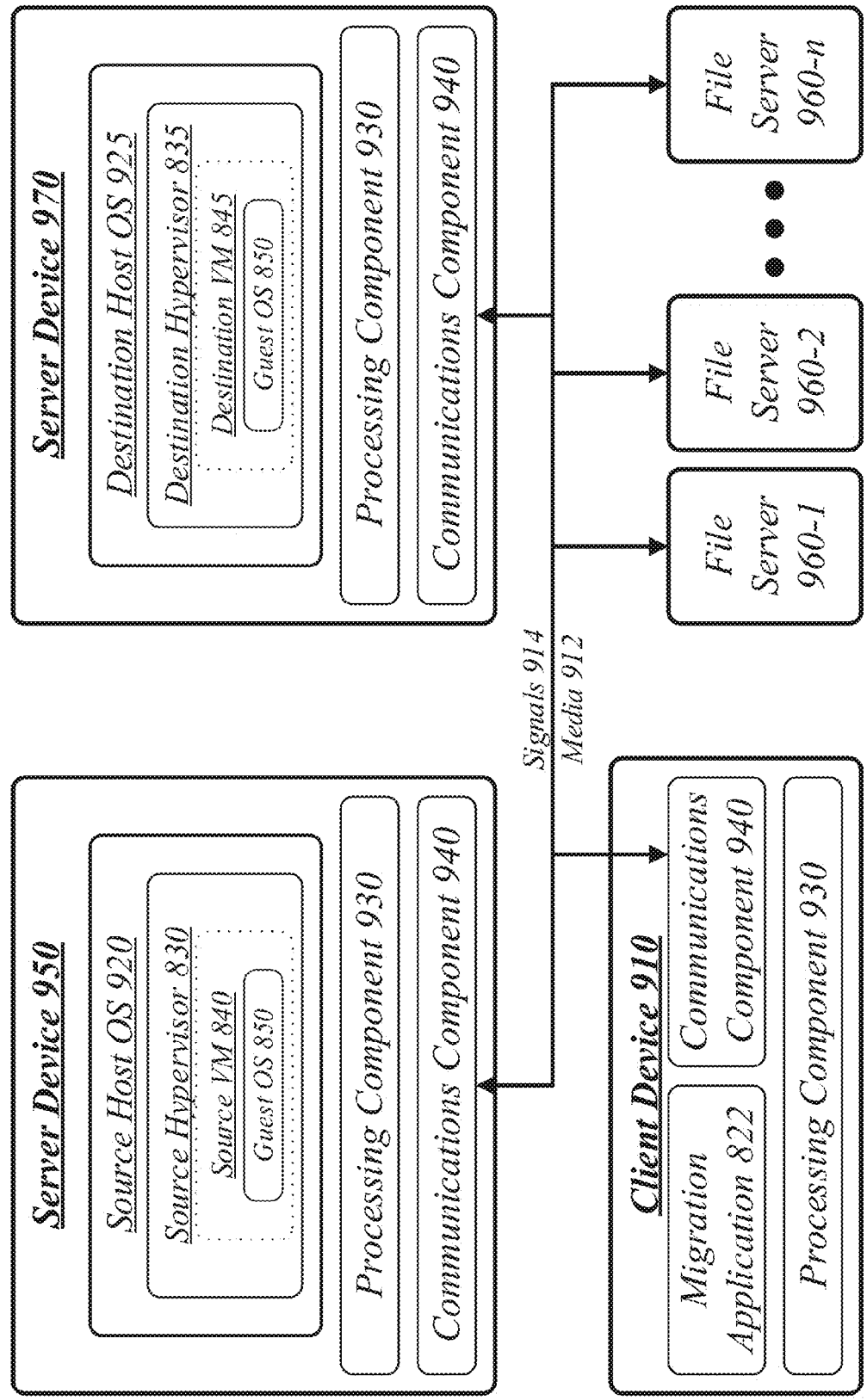
FIG. 9 illustrates an embodiment of a distributed system for the virtual machine migration system of FIG. 1.

FIG. 9 illustrates a block diagram of a distributed system 900. The distributed system 900 may distribute portions of the structure and/or operations for the distributed data system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a client device 910 and server devices 950 and 970. In general, the client device 910 and the server devices 950 and 970 may be the same or similar to the client device 820 as described with reference to FIG. 8. For instance, the client device 910 and the server devices 950 and 970 may each comprise a processing component 930 and a communications component 940 which are the same or similar to the processing component 860 and the communications component 840, respectively, as described with reference to FIG. 8. In another example, the devices 910, 950, and 970 may communicate over a communications media 912 using communications signals 914 via the communications components 940. The distributed system 900 may comprise a distributed file system implemented by distributed file servers 960 including file servers 960-1 through 960-n, where the value of n may vary in different embodiments and implementations. The local storage of the client device 910 and server devices 950, 970 may work in conjunction with the file servers 960 in the operation of the distributed file system, such as by providing a local cache for the distributed file system primarily hosted on the file servers 960 so as to reduce latency and network bandwidth usage for the client device 910 and server devices 950, 970.

The client device 910 may comprise or employ one or more client programs that operate to perform various methodologies in accordance with the described embodiments. In one embodiment, for example, the client device 910 may implement the migration application 822 initiating, managing, and monitoring the migration of the guest OS 850 from the source VM 840 to the destination VM 845. The client device 910 may use signals 914 to interact with the source hypervisor 130, destination hypervisor 835 and/or guest OS 850 while they are running on each of the source VM 840 and destination VM 845, and file servers 960.

The server devices 950, 970 may comprise or employ one or more server programs that operate to perform various methodologies in accordance with the described embodiments. In one embodiment, for example, the server device 950 may implement a source host OS 920 hosting the source hypervisor 830 providing the source VM 840. The server device 950 may use signals 914 to receive control signals from the migration application 822 on client device 910 and to transmit configuration and status information to the migration application 822. The server device 950 may use signals 914 communicate with the file servers 960 both for the providing of source VM 840 and for the migration of guest OS 850 from the source VM 840 to the destination VM 845.

The server device 970 may implement a destination host OS 925 hosting the destination hypervisor 835 providing the destination VM 845. The server device 970 may use signals 914 to receive control signals from the migration application 822 on client device 910 and to transmit configuration and status information to the migration application 822. The server device 970 may use signals 914 communicate with the file servers 960 both for the providing of destination VM 845 and for the migration of guest OS 850 to the destination VM 845 to the source VM 840.

In some embodiments, the same server device may implement both the source hypervisor 830 and the destination hypervisor 835. In these embodiments, the migration application 850 hosted on a client device 910 may perform the migration of the guest OS 850 from the source VM 840 to the destination VM 845 on this single server device, in conjunction with migration operations performed using the distributed file system.

Figure 10:
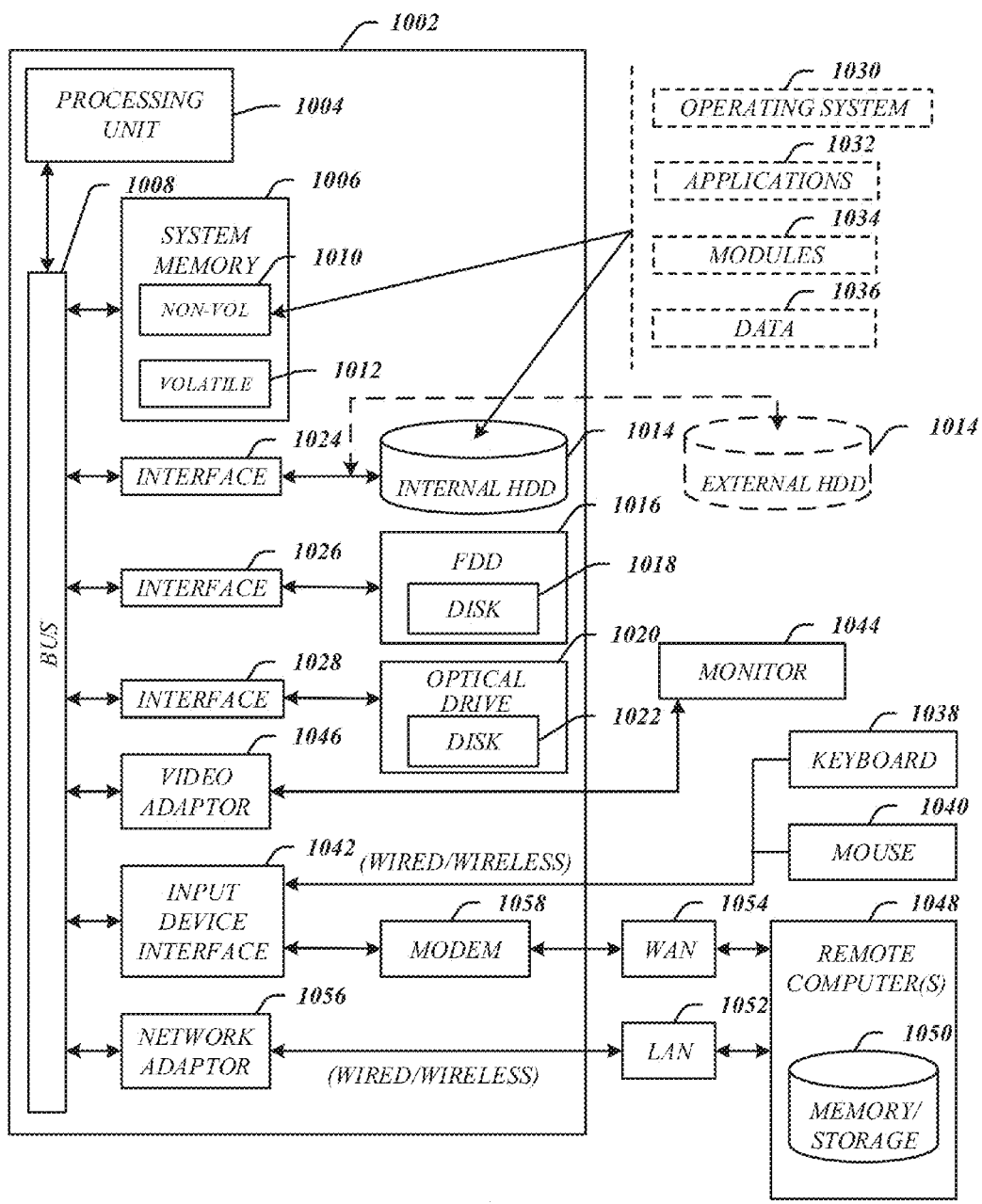
FIG. 10 illustrates an embodiment of a computing architecture.

FIG. 10 illustrates an embodiment of an exemplary computing architecture 1300 suitable for implementing various embodiments as previously described. In one embodiment, the computing architecture 1000 may comprise or be implemented as part of an electronic device. Examples of an electronic device may include those described with reference to FIGS. 8, 9, and 10 among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, scanners, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD®, Athlon®, Duron® and Opteron® processors; ARMO application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a scanner bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Scanner Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other scanner output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
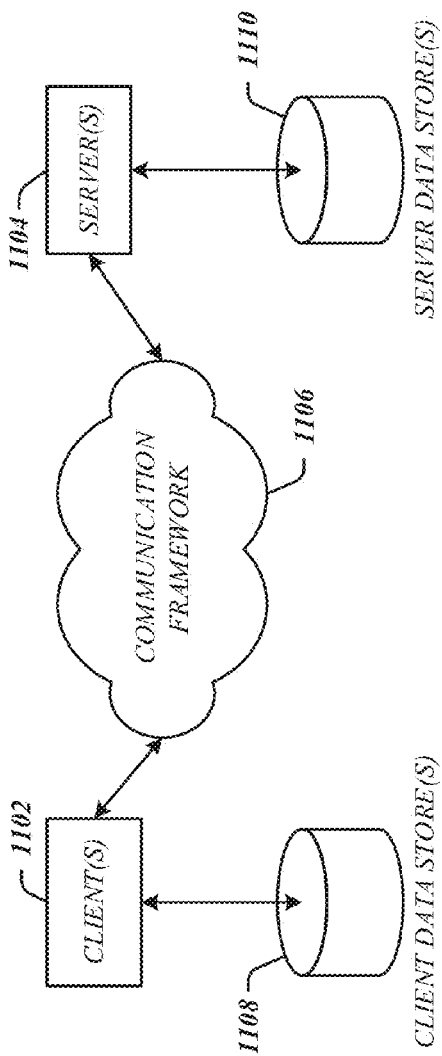
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may implement the client device 910. The servers 1104 may implement the server devices 2350/2370. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
   retrieving, by a computing device, a scanner version identifier (ID) from a file scan signature for a file in response to a received request to access the file;
   determining, by the computing device, when a current scan result for the file is valid based on whether the scanner version ID is included in a valid scanner version list and a connection count for the scanner version ID in the valid scanner version list indicates that a scanner corresponding to the scanner version ID is active;
   retrieving, by the computing device, a scan status from the file scan signature for the file, when the determining indicates that the current scan result for the file is valid; and
   determining, by the computing device, when the scan status indicates that the file is clean and providing access to the file in response to the request without scanning the file, when the determining indicates that the scan status indicates that the file is clean.

2. The method of claim 1, comprising generating, by the computing device, the valid scanner version list from multiple scanners actively performing scanning operations in a cluster of nodes, wherein the multiple scanners comprise the scanner and are services provided by non-cluster hosts.

3. The method of claim 2, comprising determining, by the computing device, a scanner version for each one of the multiple scanners.

4. The method of claim 1, comprising:
   assigning, by the computing device, the scanner version ID based on a scanner version of the scanner;
   storing, by the computing device, the scanner version ID with the file scan signature; and
   rescanning, by the computing device, the file when the determining indicates that the current scan result for the file is not valid.

5. The method of claim 1, comprising:
   collating, by the computing device, connection information for each one of multiple scanners from each of one or more cluster nodes;
   maintaining, by the computing device, a number of connections to a version of each one of multiple scanners; and
   updating, by the computing device, the connection information in the list of the valid scanner version list upon determining that a new version for one or more of the multiple scanners has been connected to one or more of the cluster nodes.

6. The method of claim 1, comprising:
   marking, by the computing device, the scanner version ID as invalid upon disconnection comprising resetting the connection count in the valid scanner list to indicate that the scanner is not currently connected; and
   delaying, by the computing device, a removal of the scanner version ID from the valid scanner version list comprising setting a timeout period associated with the scanner version ID in the valid scanner version list.

7. A non-transitory machine readable medium having stored thereon instructions for performing a method comprising machine executable code which when executed by at least one machine, causes the machine to:
   retrieve a scanner version identifier (ID) from a file scan signature for a file in response to a received request to access the file;
   determine when a current scan result for the file is valid based on whether the scanner version ID is included in a valid scanner version list and a connection count for the scanner version ID in the valid scanner version list indicates that a scanner corresponding to the scanner version ID is active;
   retrieve a scan status from the file scan signature for the file, when the determining indicates that the current scan result for the file is valid; and
   determine when the scan status indicates that the file is clean and provide access to the file in response to the request without scanning the file, when the determining indicates that the scan status indicates that the file is clean.

8. The non-transitory machine readable medium of claim 7, wherein the machine executable code when executed by the machine, further causes the machine to generate the valid scanner version list from multiple scanners actively performing scanning operations in a cluster of nodes, wherein the multiple scanners comprise the scanner and are services provided by non-cluster hosts.

9. The non-transitory machine readable medium of claim 8, wherein the machine executable code when executed by the machine, further causes the machine to determine a scanner version for each one of the multiple scanners.

10. The non-transitory machine readable medium of claim 7, wherein the machine executable code when executed by the machine, further causes the machine to;
    assign the scanner version ID based on a scanner version of the scanner;
    store the scanner version ID with the file scan signature; and
    rescan the file when the determining indicates that the current scan result for the file is not valid.

11. The non-transitory machine readable medium of claim 7, wherein the machine executable code when executed by the machine, further causes the machine to:
    collate connection information for each one of multiple scanners from each of one or more cluster nodes;
    maintain a number of connections to a version of each one of multiple scanners; and
    update the connection information in the list of the valid scanner version list upon determining that a new version for one or more of the multiple scanners has been connected to one or more of the cluster nodes.

12. The non-transitory machine readable medium of claim 7, wherein the machine executable code when executed by the machine, further causes the machine to:
    mark the scanner version ID as invalid upon disconnection and reset the connection count in the valid scanner list to indicate that the scanner is not currently connected; and
    delay a removal of the scanner version ID from the valid scanner version list and set a timeout period associated with the scanner version ID in the valid scanner version list.

13. A computing device, comprising:
    a memory containing a machine readable medium comprising machine executable code having stored thereon instructions for performing a method of providing data sessions with clients that access data containers of a shared storage; and
    a processor coupled to the memory, the processor configured to execute the machine executable code to cause the processor to:

retrieve a scanner version identifier (ID) from a file scan signature for a file in response to a received request to access the file;

determine when a current scan result for the file is valid based on whether the scanner version ID is included in a valid scanner version list and a connection count for the scanner version ID in the valid scanner version list indicates that a scanner corresponding to the scanner version ID is active;

retrieve a scan status from the file scan signature for the file, when the determining indicates that the current scan result for the file is valid; and determine when the scan status indicates that the file is clean and provide access to the file in response to the request without scanning the file, when the determining indicates that the scan status indicates that the file is clean.

14. The computing device of claim 13, wherein the processor is further configured to execute the machine executable code to cause the processor to generate the valid scanner version list from multiple scanners actively performing scanning operations in a cluster of nodes, wherein the multiple scanners comprise the scanner and are services provided by non-cluster hosts.

15. The computing device of claim 14, wherein the processor is further configured to execute the machine executable code to cause the processor to determine a scanner version for each one of the multiple scanners.

16. The computing device of claim 13, wherein the processor is further configured to execute the machine executable code to cause the processor to:

assign the scanner version ID based on a scanner version of the scanner;

store the scanner version ID with the file scan signature; and rescan the file when the determining indicates that the current scan result for the file is not valid.

17. The computing device of claim 13, wherein the processor is further configured to execute the machine executable code to cause the processor to:

collate connection information for each one of multiple scanners from each of one or more cluster nodes;

maintain a number of connections to a version of each one of multiple scanners; and update the connection information in the list of the valid scanner version list upon determining that a new version for one or more of the multiple scanners has been connected to one or more of the cluster nodes.

18. The computing device of claim 13, wherein the processor is further configured to execute the machine executable code to cause the processor to:

mark the scanner version ID as invalid upon disconnection and reset the connection count in the valid scanner list to indicate that the scanner is not currently connected; and delay a removal of the scanner version ID from the valid scanner version list and set a timeout period associated with the scanner version ID in the valid scanner version list.

* * * * *